United States Patent
Wood et al.

(10) Patent No.: US 6,915,363 B2
(45) Date of Patent: Jul. 5, 2005

(54) SYSTEM FOR SELECTIVELY CONTROLLING SPIN-UP CONTROL FOR DATA STORAGE DEVICES IN AN ARRAY USING PREDETERMINED OUT OF BAND (OOB) SIGNALS

(75) Inventors: Robert Barry Wood, Niwot, CO (US); Anthony Leigh Priborsky, Lyons, CO (US); Robert William Dixon, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 203 days.

(21) Appl. No.: 10/167,843

(22) Filed: Jun. 10, 2002

(65) Prior Publication Data
US 2003/0115413 A1 Jun. 19, 2003

Related U.S. Application Data
(60) Provisional application No. 60/341,321, filed on Dec. 13, 2001.

(51) Int. Cl.[7] .................. G08F 13/00; G08F 15/167; G08F 12/16; G08F 12/14; G08F 13/28
(52) U.S. Cl. ...................... 710/74; 710/5; 710/9; 710/10; 710/100; 710/300; 710/305; 711/114; 711/4
(58) Field of Search ............... 710/5, 9, 10, 74, 710/100, 300, 305, 74.35, 35; 711/4, 114

(56) References Cited

U.S. PATENT DOCUMENTS

| | | | | |
|---|---|---|---|---|
| 6,198,590 | B1 | * | 3/2001 | Codilian et al. ......... 360/73.03 |
| 6,233,625 | B1 | * | 5/2001 | Vander Kamp et al. ...... 710/10 |
| 6,510,481 | B1 | * | 1/2003 | Petty .......................... 710/305 |
| 6,668,305 | B1 | * | 12/2003 | Henriquez ................... 711/112 |
| 6,731,688 | B1 | * | 5/2004 | Johnson ...................... 375/257 |
| 6,766,359 | B1 | * | 7/2004 | Oliveira et al. ............. 709/213 |
| 6,782,437 | B2 | * | 8/2004 | Petty .......................... 710/100 |
| 2003/0081743 | A1 | * | 5/2003 | Chiang et al. ........... 379/93.08 |

FOREIGN PATENT DOCUMENTS

JP          11025571          * 1/1999

OTHER PUBLICATIONS

"Serial ATA: High Speed Serialized AT Attachment," Revision 1.0, Aug. 29, 2001, APT Technologies, Inc., Dell Computer Corporation, IBM Corporation, Intel Corporation, Maxtor Corporation, Seagate Technology.

* cited by examiner

Primary Examiner—Tammara Peyton
(74) Attorney, Agent, or Firm—Shumaker & Sieffert, P.A.

(57) ABSTRACT

A data storage device array includes a number of data storage devices. Each of the disc drives is operable to spin-up its spindle motor in response to the successful communication of predetermined out-of-band (OOB) signals. By selectively causing the communication of the predetermined OOB signals to the data storage devices, the selective spin-up of the data storage devices may be achieved.

23 Claims, 5 Drawing Sheets

SYSTEM FOR SELECTIVELY CONTROLLING SPIN-UP CONTROL FOR DATA STORAGE DEVICES IN AN ARRAY USING PREDETERMINED OUT OF BAND (OOB) SIGNALS

RELATED APPLICATIONS

This application claims priority of U.S. Provisional Application Ser. No. 60/341,321, filed Dec. 13, 2001.

FIELD OF THE INVENTION

This application relates generally to data storage devices and more particularly to the sequencing of spindle motor spin-up in an array of data storage devices.

BACKGROUND OF THE INVENTION

Disc drives are digital data storage devices that enable users of computer systems to store and retrieve large amounts of data in a fast and efficient manner. Disc drives of the present generation have data storage capacities in excess of tens of gigabytes (GB) and can transfer data at sustained rates of several megabytes (MB) per second.

A typical disc drive includes a plurality of magnetic recording discs which are mounted to a rotating hub of a spindle motor for rotation at a constant, high speed. An array of read/write heads are disposed on adjacent surfaces of the discs to transfer data between the discs and a host computer. The heads are radially positioned over the discs by a rotary actuator and a closed loop, digital servo system, and are caused to fly proximate the surfaces of the discs upon air bearings established by air currents set up by the high speed rotation of the discs.

A plurality of nominally concentric tracks are defined on each disc surface. A preamplifier and driver circuit generates write currents that are used by the head to selectively magnetize the tracks during a data write operation and amplifies read signals detected by the head during a data read operation. A read/write channel and interface circuit are operably connected to the preamp and driver circuit to transfer the data between the discs and the host computer.

Disc drives may be used in a stand-alone fashion, such as in a typical personal computer (PC) configuration where a single disc drive is utilized as the primary data storage peripheral. Alternatively, in applications requiring great amounts of data storage capacity or high input/output (I/O) bandwidth, a plurality of drives can be arranged into a multi-drive array, such as a RAID ("Redundant Array of Inexpensive Discs"; also "Redundant Array of Independent Discs").

As is known, a disc drive requires maximum power during a spin-up phase of operation where the spindle motor of the disc drive is brought up to operating speed. In many cases, a disc drive may draw up to double its steady state operational power during spin-up. As such, when a number of disc drives are arranged in an array, precautions must be taken so that the capability of the power supply of the disc drive array is not exceeded during spin-up of the disc drives in the array.

One way to ensure that the capability of the power supply of a disc drive array is not exceeded is to use a large capacity power supply that provides enough power to handle the simultaneous spin-up of all of the disc drives in the array. However, such large capacity power supplies add significantly to the overall cost of the disc drive array. In addition to the high cost of the large capacity power supply, there are also the related costs of extra cooling and space requirements in the disc drive array for the large capacity power supply, as well as greater overall energy use of a disc drive array so equipped.

Another way to ensure that the capability of the power supply of a disc drive array is not exceeded is to stagger the spin-up of the disc drives in the array. Typical SCSI disc drives provide a number of mechanisms to delay the spin-up of the disc drives with respect to each other. In a typical SCSI disc drive, a default "Auto Start" state causes the disc drive to spin-up automatically when power is supplied to the disc drive. To delay this Auto Start feature, and thus to delay the start of spin-up, some SCSI disc drives provide a "Disable Auto Start" jumper. When the "Disable Auto Start" jumper is set, spin-up will not occur until a start command is received by the disc drive over the SCSI bus. As such, in SCSI disc drive arrays utilizing disc drives employing the Disable Auto Start feature, the sequencing of the spin-up of each disc drive in the array may be controlled by selectively sending start commands from a host computer or array controller to the disc drives in the array.

Another mechanism that is used in SCSI disc drives to delay the spin-up time is the "Delay Auto Start" jumper. When the "Delay Auto Start" jumper is set, the spin-up of the SCSI disc drive occurs automatically a predetermined delay time after power is applied to the drive. This predetermined delay time may either be a fixed predetermined delay time or, alternatively, may be a fixed number that is multiplied by the SCSI device ID number of the disc drive to produce a desired delay time. By carefully selecting the fixed number for each disc drive of a SCSI disc drive array, the spin-up time of each disc drive in the array may be delayed or sequenced in a desired manner.

In contrast to SCSI disc drives, spin-up in typical parallel-ATA disc drives and typical serial-ATA disc drives is not controlled by commands received from a host computer or array controller. In typical parallel-ATA disc drives a scheme may be employed wherein when two parallel-ATA disc drives are used on the same ATA channel as master and slave, the spin-up of the slave drive is delayed by several seconds from the spin-up time of the master drive. Unfortunately, as a typical parallel-ATA channel may only accommodate a single pair of master/slave devices, the spin-up of only one disc drive per parallel-ATA channel may be delayed in this manner. Present serial-ATA disc drives do not include any mechanisms for staggering or sequencing the spin-up of a plurality of disc drives. In particular, there is currently no master-slave relationship in the point-to-point topology of serial-ATA interfaces.

SCSI disc drives have typically been preferred over ATA disc drives in arrays having a large number of disc drives. Part of the reason for this preference relates to the better spin-up time control that they provide. Unfortunately, SCSI disc drives are typically much more expensive that ATA disc drives. As such, there is a need for systems and/or methods that provided a greater control of spin-up times of ATA disc drives, so that inexpensive arrays of ATA disc drives may be more effectively used in multi-drive arrays.

SUMMARY OF THE INVENTION

Against this backdrop the present invention has been developed. In accordance with various embodiments of the present invention, an array of data storage devices includes a plurality of data storage devices. Each of the data storage devices in the array of data storage devices is preferably operable to spin-up its spindle motor in response to the establishment of a communications links with the data storage devices using predetermined out-of-band (OOB) signaling. By staggering or sequencing the establishment of communications links with individual data storage devices in the array, or with sets of data storage devices in the array, the data storage devices, or the sets of data storage devices, may be caused to spin-up in a predetermined sequence, such that an appropriate overall spindle motor startup power load may be achieved for the array.

In accordance with one embodiment of the present invention, an array of data storage devices includes a timing controller, two or more port controllers, and a plurality of data storage devices, each of the data storage devices being associated with, and in communication with, one of the port controllers. Each of the data storage devices is operable to spin-up its spindle motor in response to the successful communication of predetermined OOB signals with its associated port controller. Additionally, each of the port controllers is operable to communicate the predetermined OOB signals to its associated data storage devices in response to a receipt of a start signal from the timing controller. By selectively sending start signals from the timing controller to the port controllers, and thus selectively causing the port controllers to communicate the predetermined OOB signals with their associated data storage device (s), the selective spin-up of the data storage devices may be achieved.

These and various other features as well as advantages which characterize the present invention will be apparent from a reading of the following detailed description and a review of the associated drawings.

DETAILED DESCRIPTION

In general, the present disclosure describes methods and systems for controlling spindle motor spin-up in an array of data storage devices. More particularly, the present disclosure describes methods and systems for accurately controlling the sequencing of spindle motor spin-up in an array of data storage devices using out-of-band signaling, so that an appropriate overall spindle motor startup load may be achieved for the array of data storage devices.

While the various embodiments of the present invention are described herein particularly with respect to disc drives and disc drive arrays, it will be understood to those skilled in the art that the methods and systems described herein are applicable to spin-up sequencing control in other types of data storage devices and data storage device arrays.

Figure 1:
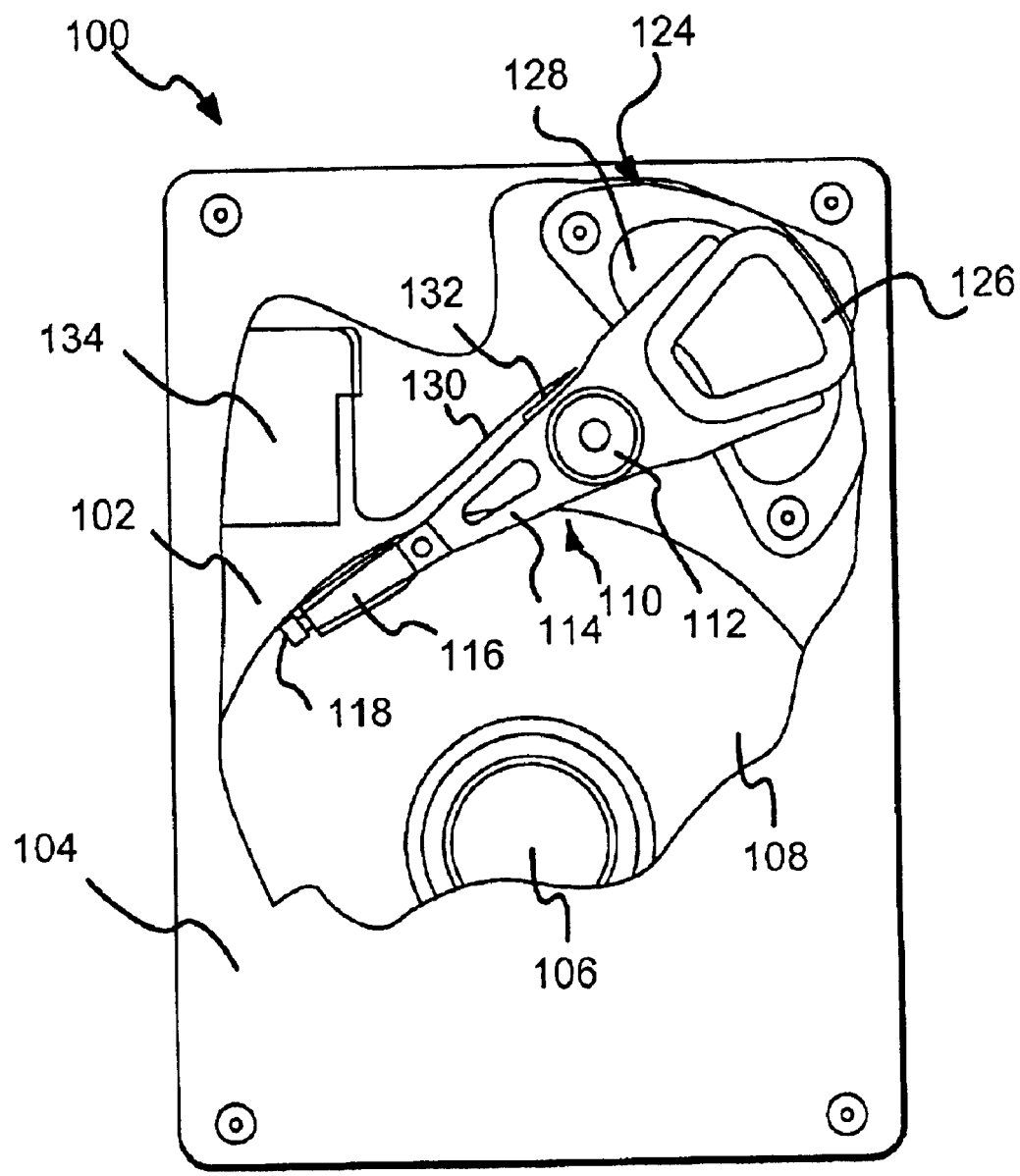
FIG. 1 is a plan view of a disc drive incorporating an embodiment of the present invention and showing the primary internal components of the disc drive.

An exemplary disc drive 100 in which embodiments of the present invention may be incorporated is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
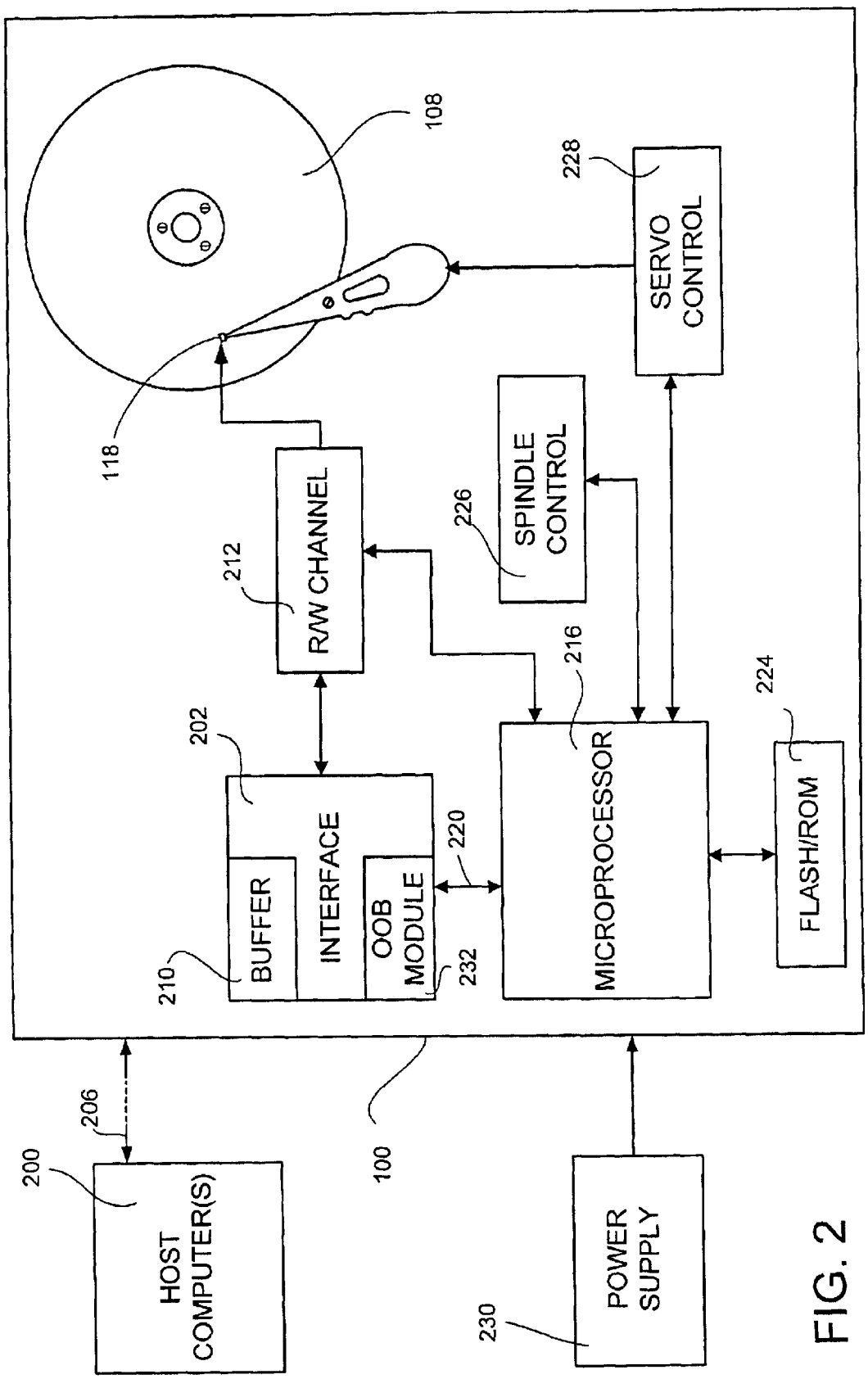
FIG. 2 is a simplified functional block diagram of the disc drive shown in FIG. 1.

Referring now to FIG. 2, shown therein is a generalized functional block diagram of the disc drive 100 of FIG. 1, illustrating some of the functional components of the disc drive 100. Some of these components may be resident on the disc drive PCB 140 and may be used to control the operation of the disc drive 100. As shown in FIG. 2, the disc drive includes an interface application specific integrated circuit (interface) 202. The interface 202 may include an associated buffer 210 to facilitate high-speed data transfer from a host computer or computers 200 to the disc drive 100. Data to be written to the disc drive 100 are passed via one or more data paths 206 to the interface 202 and then to a read/write channel 212, which encodes and/or serializes the data and provides the requisite write current signals to the heads 118. To retrieve data that has been previously stored by the disc drive 100, read signals are generated by the heads 118 and provided to the read/write channel 212, which performs decoding and error detection and correction operations and outputs the retrieved data to the interface 202 for subsequent transfer to the computer 200. Such operations of the disc drive 100 are well known in the art and are discussed, for example, in U.S. Pat. No. 5,276,662 issued Jan. 4, 1994 to Shaver et al.

As also shown in FIG. 2, a microprocessor 216 is operably connected 220 to the interface 202. The microprocessor 216 provides top level communication and control for the disc drive 100 in conjunction with programming for the microprocessor 216 which may be stored in a non-volatile microprocessor memory (MEM) 224. The MEM 224 can include random access memory (RAM), read only memory (ROM) and other sources of resident memory for the microprocessor 216. Additionally, the microprocessor 216 provides control signals for spindle control 226, and servo control 228.

Figure 3:
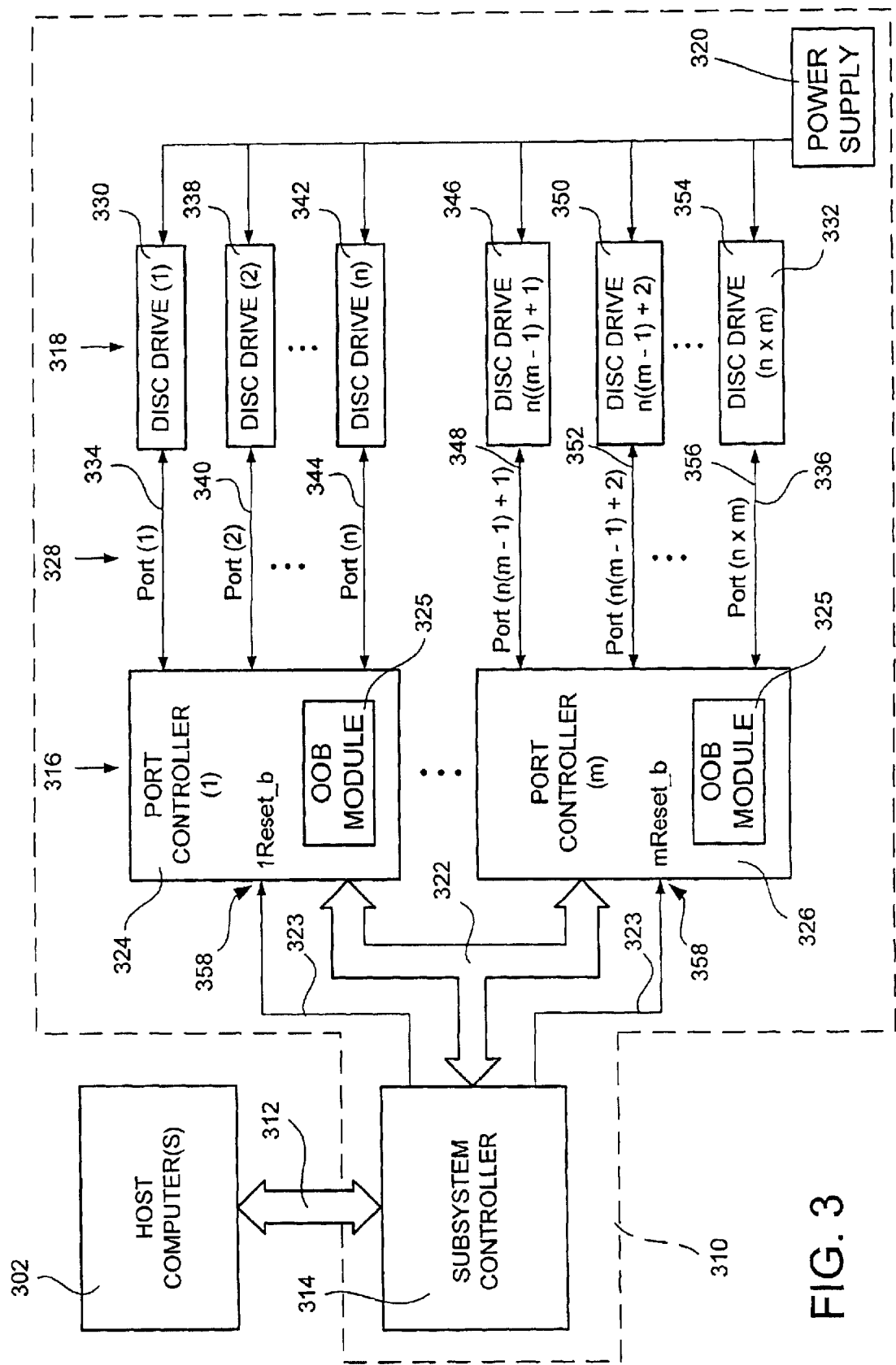
FIG. 3 is a functional block diagram of a disc drive array incorporating embodiments of the present invention.

Also shown in FIG. 2 is a power supply 230 operably connected to the disc drive 100 for supplying appropriate operating power thereto. As will be described in greater detail below, the power supply 230 may be connect to a number of disc drives other than the disc drive 100, such as disc drives that are part of disc drive array 300 (FIG. 3). Additionally, the power supply 230 may also provide power to other storage subsystem or computer components.

In various embodiments, the disc drive will include the appropriate functionality to communicate over various device located layers such as an application layer, a transport layer, a link layer, and/or a physical layer, in accordance with various industry specifications. For example, the disc drive 100 may provide the functionality to communicate via layers in accordance with a Serial-ATA industry standard interface specification, such as, without limitation, the Serial ATA 1 interface specification (SATA) promulgated by the Serial ATA Working Group, the Serial ATA II interface specification currently under development by the Serial ATA II Work Group, or the Serial Attached SCSI (SAS) specification previously developed by the Serial Attached SCSI Working Group and currently being developed by the ANSI T10 Committee, or any progeny of these specifications. With respect particularly to the Serial ATA 1 specification, the current specification is the "Serial ATA: High Speed Serialized ATA Attachment Specification," Revision 1, 29-Aug.-2001, which is incorporated herein by reference.

Those skilled in the art will appreciate that interface specifications, such as those mentioned above, are usually updated and that new versions, variations, or revisions may be created and promulgated over time. In this respect, various embodiments of the present invention are not necessarily limited to any one particular version, variation, or revision of the above-mentioned specifications. Furthermore, other current or later developed specifications having similar operational characteristics may be used in accordance with the present invention. With respect to the various embodiments of the present invention described herein, it is preferable that the interface specification employed includes a physical layer on which out-of-band (OOB) signaling may be communicated to establish a communication link with the disc drive. As used herein, the term out-of-band signaling means any transmission of signals or information that takes place using frequencies or channels outside the normal frequencies or channels used for transfer of I/O commands and user data to and from the disc drive.

In one embodiment of the invention, the disc drive includes an OOB module 232 that is operable to send and receive OOB signals over the physical layer. While the OOB module 232 is shown in FIG. 2 as residing in, or as a part of, the interface 202, the capabilities of the OOB module 232, as well as any interface specific capabilities, may be provided by the interface 202 alone, by the microprocessor 216 alone, by the interface 202 in conjunction with the microprocessor 216, or by any other combination of hardware, software, and/or firmware in the disc drive that is suitable to perform these functions.

Referring now to FIG. 3, shown therein is an exemplary operating environment 300 incorporating various features or embodiments of the present invention. As shown, the operating environment 300 includes the host computer(s) 302 and a disc drive array 310. The host computer(s) 302, may comprise one more stand-alone or networked computers or devices that are operable to send and receive information and/or commands to and from the disc drive array 310. In this embodiment, the disc drive array 310 includes a subsystem controller 314, one or more port controllers 316, a plurality of disc drives 318, and a power supply 230. The disc drive array 310 provides common control and management for the plurality of disc drives 318.

As shown in FIG. 3, the host computer 302 is operably connected 312 to the subsystem controller 314. The host computer(s) 302 may communicate with the subsystem controller 314 via the connections 312 using any number of appropriate interfaces, such as, without limitation: Serial ATA, ATA/IDE, SCSI, USB, IEEE-1394 (Firewire), Fiber Channel, iSCSI, etc. As will be appreciated by those skilled in the art, the connections 312 will preferably comply with the interface being employed between the host computer 302 and the subsystem controller 314. Similarly, both the host computer(s) 302 and the subsystem controller 314 will preferably include the appropriate hardware and/or software necessary to effectuate data and command transmission and reception over the particular connection(s) 312 and interface employed between the host computer(s) 302 and the subsystem controller 314.

In one embodiment, the common control and management for the plurality of disc drives 318 occurs principally in the subsystem controller 314. In this embodiment, the subsystem controller 314 may perform, without limitation, volume management, RAID management, command transformation, bridging functions, routing, aggregation (RAID, mirroring, striping, or other), high-level error recovery, and/or performance optimization for the multiple storage devices. In other embodiments, one or more common control and management functions may be carried out, all or in part, in the host computer(s) 302, in an intelligent host bus adapter, and or in a port controller 316. It should be noted that in various embodiments the subsystem controllers 314 may be redundant.

In one embodiment, the subsystem controller 314 includes appropriate hardware, software, and/or firmware to effectuate the selective transmission of a start command to each of the port controllers 316 within the disc drive array 310, where a start command comprises a signal or signals that indicate, instruct, allow, or initiate predetermined OOB signals to disc drives associated with the port controller, as will be described in greater detail below. In one embodiment, the subsystem controller 314 communicates the start signal via the connection(s) 322, described as the primary data path between storage controller(s) 314 and port controllers 316. In another embodiment, the subsystem controller 314 communicates the start signal via a command path 323 that is distinct from the connection(s) 322.

In the case where the subsystem controller 314 includes appropriate hardware, software, and/or firmware to effectuate the selective transmission of the start command to each of the port controllers 316, the subsystem controller 314 will also preferably include appropriate logic and/or programming to provide selective transmission of the start command to each of the port controllers. In this way, as described in detail below, the subsystem controller 314 may perform as a timing controller that selectively activates each of the port controllers and, as result thereof, selective control spin-up of the disc drives in the disc drive array 310.

In an alternative embodiment, selective transmission of the start command to each of the port controllers will not be effectuated and controlled by the subsystem controller 314, but rather by a proprietary timing controller (not shown), or a set of timing controllers associated with one or more port controllers 316, comprising specific hardware, software, and or firmware that is specifically designed for selectively activating the port controllers by sending the start signal. In yet another alternative, rather than sending a start signal to selectively activate the port controllers, the timing controller (s) may simply selectively apply power to the port controllers to cause the selective activation of the port controllers.

As shown in FIG. 3, the disc drive array 310 preferably includes two or more port controllers 316, shown as port controller (1) 324 through port controller (m) 326, each of which is operably connected 322 to the subsystem controller 314. The subsystem controller 314 may communicate with the port controllers 316 via the connections 322 using any number of interfaces, such as, without limitation: Serial ATA, ATA/IDE, SCSI, USB, IEEE-1394 (Firewire), Fiber Channel, etc.

In one embodiment, the port controllers 316 may simply comprise simple physical layer controllers that provide OOB signaling and/or serialization and deserialization (SerDes) capabilities. In other embodiments, the port controllers 316 may include additional features and capabilities such as, without limitation, PHY multiplexing and/or bandwidth aggregating.

The connections 322 will preferably comply with the particular interface or interfaces being employed between the subsystem controller 312 and the port controllers 316. Additionally, both the subsystem controller 314 and the port controllers 316 will preferably include the appropriate hardware and/or software necessary to effectuate data and command transmission and reception over the particular connection(s) 322 and interface employed therebetween. In one embodiment, each of the interfaces employed to communicate between the subsystem controller 314 and the various port controllers 316 will be identical. In other embodiments, two or more of the interfaces employed to communicate between the subsystem controller 312 and the various port controllers 316 may be different.

In the case where a port controller receives the start command over the communication interface, the port controller will preferably include appropriate logic or programming to recognize and effectuate the start command. In the case where a port controller receives the start command via a command path 323, the port controller will preferably include appropriate hardware to receive the start command, such a command pin 358, and the appropriate logic or programming to recognize and effectuate the start command.

In addition to including the appropriate hardware and/or software necessary to effectuate data and command transmission and reception via the interface employed to communicate between the port controller 316 and the subsystem controller 314, each port controller 316 will also preferably have the functionality to effectuate data and command transmission and reception between the port controller 316 and any disc drive 318 operably connected thereto. In particular, each port controller 316 will preferably have the functionality to communicate with the disc drives 318 connected thereto via an interface that supports OOB signaling over a PHY layer. In this regard, each of the port controllers will preferably include one or more OOB modules 325 that is operable to send and receive OOB signals between the port controller and the disc drives 318 operably connected thereto. Additionally, in the case where the interface that is employed between the port controller and the subsystem controller also requires the communication of OOB signals, the OOB module 325 will also be operable to send and receive OOB signals between the port controller 316 and an OOB module located in the subsystem controller 314.

In the case where the interfaces employed between a given port controller 316 and the subsystem controller 314 is not the same as the interface employed between the given port controller 316 and the disc drives 318 connected thereto, appropriate conversion between the two different interfaces will be provided by the given port controller 316.

Each of the port controllers 316 is operably connected to one or more disc drives 318 shown in FIG. 3 as disc drive (1) 330 through disc drive (n×m) 332, via communication paths 328, herein referred to as a ports, and shown in FIG. 3 as port (1) 334 through port (n×m) 336. For example, as shown in FIG. 3, port controller (1) 324 is operably connected to disc drive (1) 330 via port (1) 334, to disc drive (2) 338 via port (2) 340, and to disc drive (n) 342 via port (n) 344. Similarly, port controller (m) 326 is operably connected to disc drive (n(m−1)+1) 346 via port (1) 348, to disc drive (2) 350 via port (2) 352, and to disc drive (n) 354 via port (n) 356.

As used herein, the term port refers to the physical components, such as cables and connectors, that comprise the communication paths 328. Each given port will preferably comply with the interface specification that is employed between the port controller 316 and disc drive 318 connected by the port controller. In other embodiments, the communication paths 328 may be physically instantiated on a backplane in a method that is, or is not, covered by a particular specification or in a vendor-unique manner.

In this embodiment, each of the disc drives 318 in the disc drive array 310 will preferably include functionality, such as that described above with respect to disc drive 100. In particular, each of the disc drives will be operable to communicate with a port controller 316 via an interface that supports OOB signaling over a PHY layer. As described above, this functionality may be provided in the disc drive by an OOB signal module, which is not specifically illustrated in the disc drives 318 shown in FIG. 3. Additionally, each disc drive 318 in the disc drive array 310 may receive power from one or more power supplies, such as power supply 320.

In one embodiment, the interface employed by each of the disc drives 316 will be operable to send and receive data and commands in accordance with the SATA interface specification. In particular, in this embodiment, each of the disc drives 318, as well as each of the port controllers 316, will be operable to send and receive OOB signals in accordance with the SATA interface specification. These OOB signals, including COMRESET, COMWAKE, and COMINIT signals, will be exchanged between the disc drives 318 and the port controllers 316 in this embodiment to establish a communication link. Once this link has been established spin-up of the disc drives 318 may occur. Details regarding the specific transmission order and composition of these signals are described in the "Serial ATA: High Speed Serialized ATA Attachment Specification," Revision 1, 29-Aug.-2001, which is incorporated herein by reference.

Figure 4:
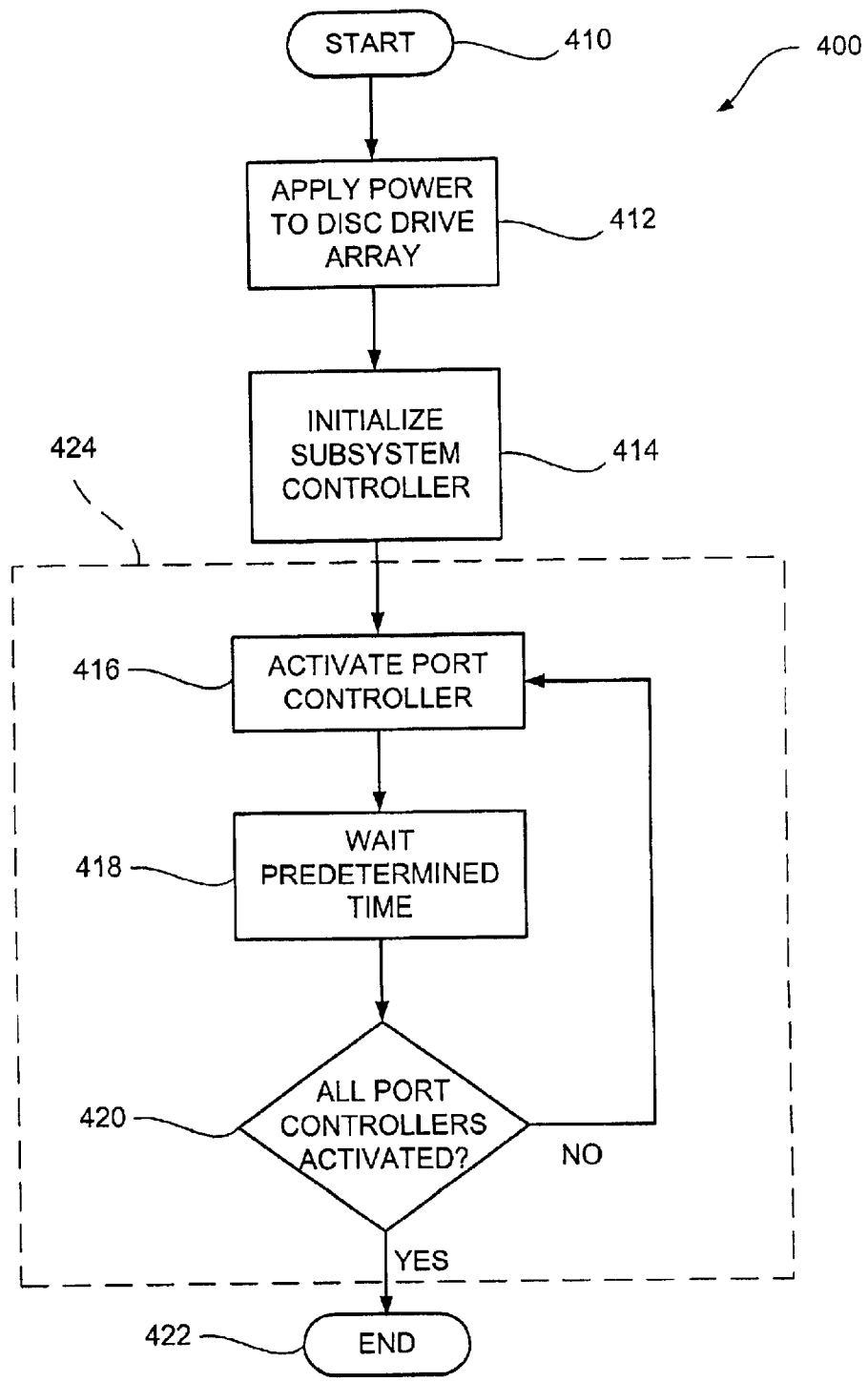
FIG. 4 is an operational flow diagram illustrating operations that may occur in the disc drive array of FIG. 3 in accordance with embodiments of the present invention.

Turning now to FIG. 4, shown therein is an operational flow 400 illustrating various operations that occur in the disc drive array 310 in accordance with one embodiment of the present invention. In particular, the operational flow 400 illustrates one method by which the spin-up times of individual disc drives 318 or groups of disc drives in the disc drive array 310 may be staggered or controlled. As shown in FIG. 4, at the start of the operational flow 400 an apply power operation 412 applies power to the disc drive array 310. In one embodiment, the apply power operation 412 applies power to the subsystem controller 314, to each of the port controllers 316, and to each of the disc drives 318. In other embodiments, the apply power operation 412 applies power only to the to the subsystem controller 314 and to each of the port controllers 316.

Following the apply power operation 412, an initialize operation 414 initializes the subsystem controller 314. As used here, the initialization of the subsystem controller 314 may, without limitation, simply comprise establishing the correct operational state of the subsystem 30 controller 314. Next, an activate operation 416 activates one or more of the port controllers 316. During the activation operation 416 the port controller will be caused to initiate OOB signaling over the PHY layer to each disc drive 318 attached thereto, such that a communications link is established between the activated port controller(s) and the disc drive(s) associated with the activated port controller(s). The precise signaling that is used or exchanged by a port controller 316 and a disc drive to establish the communications link will be dependent on the precise interface that is being employed by the port controller 316 and the disc drive 318. For example, in one embodiment, as a result of the activation operation 416, a port controller 316 will start the transmission of COMRESET OOB signals to each of the disc drives connected thereto. The port controller 316 and the connected disc drives will then exchange COMINIT and COMWAKE signals to establish a communications link. As described below with respect to FIGS. 5 and 6, once the communications link has been established, the disc drive is spun-up.

The activate operation 416 may be performed by sending a start signal to the port controller. As previously described, the start signal may be sent to the port controller by the subsystem controller 314 or by a proprietary timing controller designed specifically for selectively sending the start signal to the port controller. Furthermore, the activate operation 416 may be performed or effectuated either via a signal sent over the interface or interfaces employed between the subsystem controller 312 and the port controllers 316, i.e.: 322, or via a signal transmission path 323 other than the interface or interfaces employed between the subsystem controller 312 and the port controllers 316.

In the case where the activate operation 416 is performed or effectuated either via a signal sent over the interface or interfaces employed between the subsystem controller 312 and the port controllers 316 the subsystem controller 314 may, without limitation, use OOB signaling to establish an operational link 322 to the port controllers 316, after which an activated port controller would in turn initiate OOB with its associated disc drives 318. In this manner, the operational link between the subsystem controller and port controllers may be staggered by the timing controller, thus causing the staggered or sequenced spin-up of the disc drives.

In the case where the activate operation 416 is performed or effectuated via a signal transmission path other than an interface(s), the port controller 316 may receive one or more signals (start command) via the signal transmission path that cause the port controller 318 to initiate OOB signaling over the PHY layer to each disc drive 318 attached thereto. For example, in one embodiment, the activate operation 416 activates a port controller(s) 316 by asserting or deasserting a signal at the start command pin 358 on the appropriate port controller(s) 316. The assertion or deassertion of the signal at the start command pin 358, and thus the performance of the activate operation 416, may be controlled either by the subsystem controller 314 selectively communicating the predetermined start signal to one or more of the plurality of port controllers, via command paths 323 operably connected between the subsystem controller 312 and the port controllers, or by a proprietary timing controller.

Following the activate operation 416, a wait operation 418 delays the operational flow 400 a predetermined time. The predetermined time will preferably be selected such that the disc drive(s) 318 will be activated in a staggered manner so that the load on the power supply 320 from the disc drives is distributed over time, such that the current capacity of the power supply is not exceeded. In the case where the subsystem controller 314 effectuates the activate operation 416, the wait operation 418 will be performed by the subsystem controller 314. In the case where hardware or software components other than the subsystem controller 314 effectuates the activate operation 416, the wait operation 418 will be performed by the other hardware or software components.

In one embodiment, following the wait operation 418, a determination operation 420 will determine if the desired port controllers in the disc drive array have been activated. If all of the desired port controllers have not been activated, the operational flow 400 will return to the activate operation 416, and operational flow 400 will continue as just described. If it is determined by the determination operation that all of the desired port controllers have been activated, the operational flow 400 will end 422. In this way, an operational loop 424 is formed including the activate operation 416, the wait operation 418, and the determination operation 420, wherein the operational loop is not exited until each of the desired port controllers in the disc drive array have been activated and, thus, all of the disc drives in the disc drive array have been spun-up.

As will be understood by those skilled in the art, each of the operations in the loop 424 including the activate operation 416, the wait operation 418, and the determination operation 420, may be performed in an order other than the order shown in FIG. 4. For example, and without limitation, the determination operation may occur before the activation operation. Additionally, in some embodiments, the determination operation 420 may not occur at all. For example, in an alternative embodiment, a series of activation 416 and wait operations 418 may be performed in a specific order with respect to the port controllers, such that each of the port controllers is activated in a desired sequence. Regardless of the particular order of operation used to control or stagger the activation of the various port controllers, the activate operation 416, the wait operation 418, and the determination operation 420 may generally be referred to as occurring in a timing controller, where the timing controller may comprise the subsystem controller 314 or a proprietary timing controller.

Figure 5:
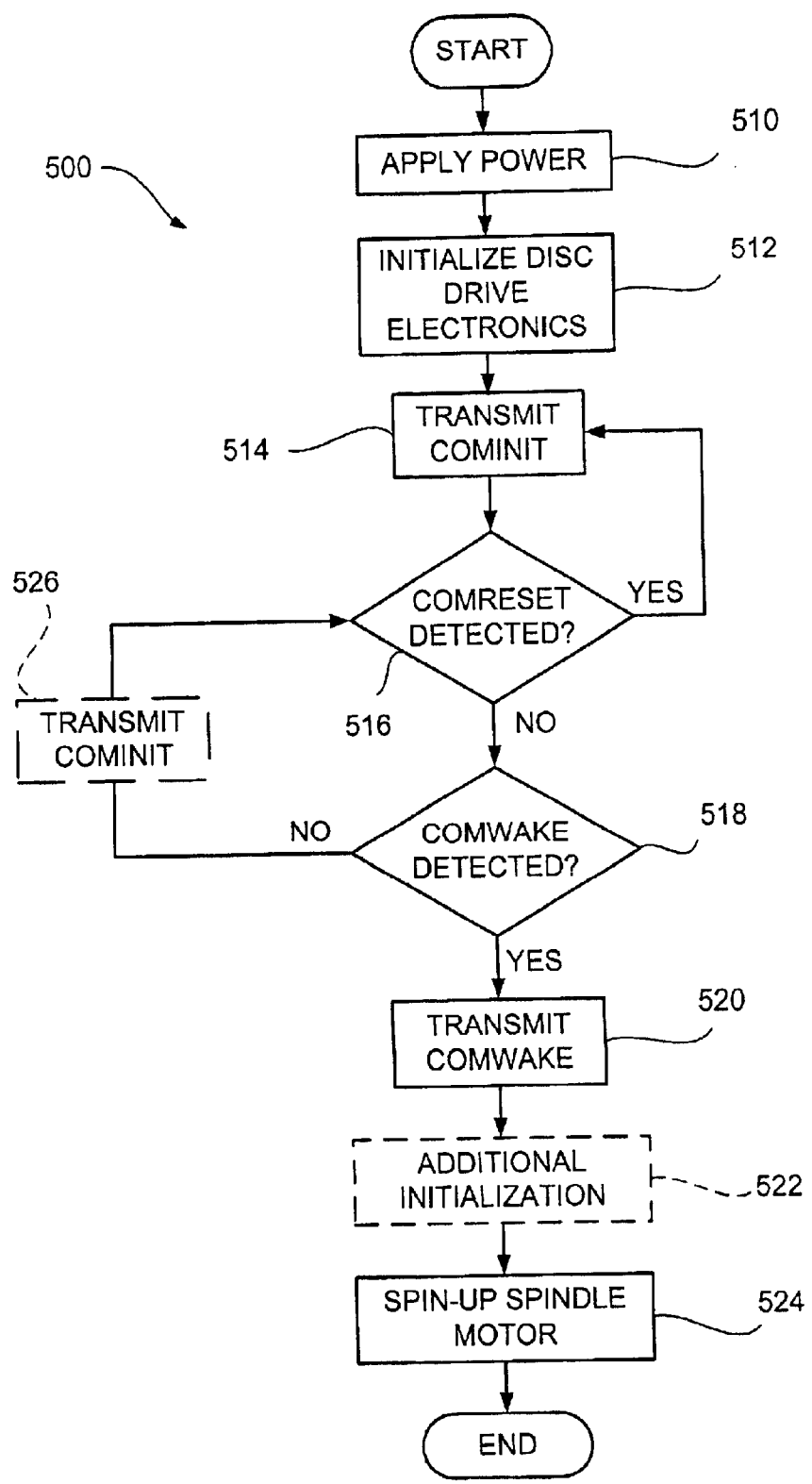
FIG. 5 is an operational flow diagram illustrating operations that may occur in a disc drive array of FIG. 3 in accordance with embodiments of the present invention.

FIG. 5 illustrates one embodiment relating to the spinning-up of disc drives 318 of the disc drive array 310. For illustration purposes, the operational flow 500 will be described particularly with respect to operations that may take place between the OOB module 325 of the port controller 324 and the OOB module (not shown) of the disc drive 330. As will be understood, similar operations will preferably take place between the OOB module 325 and OOB modules in each of the disc drives operably connected thereto. In addition, it will be understood that similar operations will preferably take place between OOB modules in each of the port controllers 316 in the disc drive array 310 and OOB modules in the disc drives operably connected thereto upon the activation of the port controllers by activation operation 416 (FIG. 4).

The operational flow 500 may occur during, or as a result of, the activation operation 416. At the start of the operational flow 500, and in the case where the disc drive 330 has not already had power applied to it, such as may occur during the apply power operation 412, an apply power operation 510 applies power to the disc drive 330. The step of applying power to the disc drive may be accomplished in any number of ways, including, without limitation, simply turning on, or causing to be turned on, the power supply 320.

Next, in the case where the electronics of the disc drive 330 have not already been initialized, such as may occur during the apply power operation 510, an initialization operation 512 initializes the electronics of the disc drive 330. As will be appreciated, the precise manner in which disc drive electronics are initialized may be device dependent. However, in general the initialization of the disc drive will include establishing an operational state in the disc drive that allows OOB signals to be broadcasted and received.

Following the initialization of the disc drive, a transmit operation 514 causes an OOB COMINIT signal to be sent from the disc drive 330 to the port controller 324. Next, a COMRESET detect operation 516 determines if an OOB COMRESET signal is detected at the disc drive 330 from the port controller 324. If a OOB COMRESET signal is detected by the detect operation 516, the operational flow 500 returns to the transmit operation 514. If an OOB COMRESET signal is not detected by the detect operation 516, a determination operation 518 determines whether an OOB COMWAKE signal is detected at the disc drive 330 from the port controller 324. If an OOB COMWAKE signal is not detected by the determination operation 518, the operational flow 500 returns to the COMRESET detect operation 516. As shown in FIG. 5, an optional COMINIT transmit operation 526 may occur in the operational flow before returning to the COMRESET detect operation 516, in the case where OOB COMWAKE signal is not detected by the determination operation 518. In other words, the disc drive may retry to establish a viable link with its port controller 316.

If an OOB COMWAKE signal is detected by the determination operation 518, a transmit operation 520 causes an OOB COMWAKE signal to be transmitted to the port controller 324. Upon completion of the transmit operation 520 a viable link will have been established between the disc drive 330 and the port controller 324.

Following the transmit operation 520, an additional initialization operation 522 may optionally be performed. The additional initialization operation 522 may include a number of different synchronization, alignment, or other operations. For example, and without limitation, in one embodiment, the additional initialization operation 522 includes or initiates the exchange of alignment signal sequences between the disc drive 330 and the port controller 324, such that a communication speed may be established between the disc drive 330 and the port controller 324. The alignment operations 522 may optionally be performed after or concurrently with operation 524.

Following the additional initialization operation 522, or in the case where the additional initialization operation 522 is not performed following the transmit operation 520, a spin-up operation 524 causes the spindle motor of the disc drive 330 to be spun-up. After the spindle motor of the disc drive 330 has been spun-up, the operational flow 500 ends.

It should be noted that in the case where power is applied to one or more of the disc drives in the disc drive array after the power has been applied to the disc drive array in general, transmit operation 514 will likely occur before the detect operation 516 detects an OOB COMRESET signal.

In the case where power is applied to the disc drives 318, either simultaneously with or after power has been applied to all or a portion of the remaining elements of the disc drive array, the first OOB signal on a given communication link 328 may be a COMRESET signal. In such a case the operational flow 500 would not include transmit operation 514.

In summary, in view of the foregoing discussion it will be understood that various 30 embodiments of the present invention relate to selectively spinning-up data storage device spindle motors in an array of data storage devices. In accordance with one embodiment, a system comprises a plurality of data storage devices (such as 318), a plurality of port controllers (such as 316), each of which is associated with one or more of the data storage devices, and a timing controller (such as 314) associated with each of the port controllers. In this embodiment, the timing controller is operable to selectively communicate a predetermined start signal to one or more of the plurality of port controllers. In turn, each of the port controllers is operable to communicate predetermined OOB signals to its associated data storage device(s) upon receiving the predetermined start signal. Finally, each of the data storage devices is operable to spin-up its spindle motor in response to the successful communication of predetermined out-of-band (OOB) signals with the disc drive.

In accordance with this embodiment, at least one of the plurality of port controllers may include a first OOB module (such as 325) that is operable to communicate the predetermined OOB signals. Likewise, at least one of the data storage devices associated with the at least one port controller may include a second OOB module (such as 232) that is operable to communicate the predetermined OOB signals.

In accordance with another embodiment, a method of spinning-up a spindle motor in a data storage device includes the steps of communicating a predetermined sequence of out-of-band (OOB) signals to the data storage device (such as 514, 516, 518, and or 520), and responsive to the successful communication of the predetermined sequence of OOB signals, spinning-up the spindle motor in the data storage device (such as 524). In accordance with this embodiment, the predetermined sequence of OOB signals may be communicated between a port controller (such as 316) and the disc drive in operative communication with the port controller. Also in accordance with this embodiment, the port controller may communicate the predetermined sequence of OOB signals with the disc drive in response to a predetermined start signal (such as 416). The predetermined start signal may be transmitted to the port controller from a timing controller (such as 314) in operative communication with the port controller. Additionally, the timing controller may be in operative communication with additional port controllers. In such a case, the timing controller may selectively transmit the predetermined start signal to the port controllers at different times (such as 418).

In accordance with another embodiment of the present invention a system for selectively controlling spin-up times in an array of data storage devices includes a plurality of data storage devices (such as 318) and a control means (such as 314). In accordance with this embodiment, each data storage device includes a spindle motor (such as 106) and each storage device is operable to cause the spin-up of its spindle motor in response to the successful communication of a predetermined sequence of OOB signals with the data storage device. Additionally, the control means is operable to selectively cause the communication of the predetermined out-of-band (OOB) signals with the data storage devices. In accordance with this embodiment, the system may further include two or more port controllers (such as 316) operably connected to the control means. In this case, each of the two or more port controllers will preferably each be associated with one or more of the plurality of data storage devices. The control means will selectively cause the two or more port controllers to communicate the predetermined out-of-band (OOB) signals with their associated data storage device by selectively sending predetermined start signals to the two or more port controllers.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, while the present invention has been described particularly with respect to disc drives, the systems and methods of the present invention may also be applicable to other systems and devices that that include a spindle motor that can be spun-up in response to the establishment of a communications links with the systems and devices using predetermined out-of-band (OOB) signaling. Additionally, while the present invention has been described with respect to spinning-up spindle motors in devices in response to the establishment of a communications links, the systems and methods described herein may also be applicable to the selective or sequential powering-up or activating of other hardware or software in arrays of various devices. For example, the systems and methods described herein may in general be used to sequence the start-up of various hardware and/or software in multi-element systems via the selective establishment of communications links with various elements of the system using OOB signaling. Numerous changes may be made that will readily suggest themselves to those skilled in the art and that are encompassed in the spirit of the invention disclosed and as defined in the appended claims.

What is claimed is:

1. A system for selectively controlling spin-up times of data storage devices in an array of data storage devices, comprising:
    a plurality of data storage devices, each data storage device spinning-up in response to the successful communication of predetermined out-of-band (OOB) signals;
    a plurality of port controllers, each port controller being associated with one or more of the plurality of data storage devices, each port controller communicating the predetermined OOB signals to its associated data storage device or devices upon receiving a predetermined start signal; and
    a timing controller operable to selectively communicate the predetermined start signal to one or more of the plurality of port controllers.

2. A system as defined in claim 1, wherein at least one of the plurality of port controllers includes a first OOB module operable to communicate the predetermined OOB signals and wherein at least one of the data storage devices associated with the at least one port controller includes a second OOB module operable to communicate the predetermined OOB signals.

3. A system as defined in claim 2, wherein the predetermined OOB signals conform with a serial-ATA interface specification.

4. A system as defined in claim 2, wherein the predetermined OOB signals conform with a serial attached SCSI (SAS) interface specification.

5. A system as defined in claim 1, wherein the timing controller comprises a subsystem controller operably connected to each of the plurality of port controllers.

6. A system as defined in claim 5, wherein the subsystem controller is operably connected to each of the port controllers via an interface and a command path, and wherein the subsystem controller selectively communicates the predetermined start signal to one or more of the plurality of port controllers via the command path.

7. A system as defined in claim 5, wherein the subsystem controller is operably connected to each of the port controllers via an interface and wherein the subsystem controller selectively communicates the predetermined start signal to one or more of the plurality of port controllers via the interface.

8. A system as defined in claim 5, wherein the subsystem controller is operably connected to each of the port controllers via a first type of interface and wherein each of the plurality of port controllers is operably connected to its associated data storage devices via a second type of interface.

9. A system as defined in claim 8, wherein the first interface is not of the same type as the second interface.

10. A system as defined in claim 3, wherein each of the plurality of data storage devices comprises a disc drive.

11. A method of spinning-up a spindle motor in a data storage device, comprising steps of:
    transmitting a predetermined start signal from a timing controller to a port controller;
    responsive to the predetermined start signal, communicating a predetermined sequence of out-of-band (OOB) signals between the port controller and the data storage device; and
    responsive to the successful communication of the predetermined sequence of OOB signals, spinning-up the spindle motor in the data storage device.

12. A method as defined in claim 11, wherein the timing controller is a data storage device array subsystem controller.

13. A method as defined in claim 11, wherein the timing controller is in operative communication with a second port controller and wherein the timing controller selectively transmits the predetermined start signal to the first aforesaid port controller and to the second port controller at different times.

14. A method as defined in claim 11, wherein the predetermined sequence of OOB signals conforms with a serial ATA interface specification.

15. A method as defined in claim 11, wherein the predetermined sequence of OOB signals conforms with a serial attached SCSI (SAS) interface specification.

16. A method as defined in claim 11, wherein the data storage device comprises a disc drive.

17. A method as defined in claim 13, wherein the timing controller transmits the predetermined start signal to the second port controller a predetermined time after the predetermined start signal has been transmitted to the first port controller.

18. A method as defined in claim 13, wherein the timing controller transmits the predetermined start signal to the second port controller after the data storage device has been spun-up.

19. A system for selectively controlling spin-up times in an array of data storage devices, comprising:

a plurality of data storage devices, each data storage device including a spindle motor, each data storage device causing the spin-up of its spindle motor in response to the successful communication of a predetermined sequence of OOB signals with the data storage device; and a control means for selectively causing the communication of the predetermined out-of-band (OOB) signals with the data storage devices.

20. A system as defined in claim 19, further comprising two or more port controllers operably connected to the control means, wherein each of the two or more port controllers is associated with one or more of the plurality of data storage devices and wherein the control means selectively causes the two or more port controllers to communicate the predetermined out-of-band (OOB) signals with their associated data storage device by selectively sending predetermined start signals to the two or more port controllers.

21. A system as defined in claim 19, wherein the control means comprises a proprietary timing controller.

22. A system as defined in claim 19, wherein the control means comprises a subsystem controller.

23. A system as defined in claim 19, wherein predetermined OOB signals conform with a serial-ATA interface specification.

* * * * *